United States Patent
Rice et al.

(10) Patent No.: US 11,218,466 B2
(45) Date of Patent: Jan. 4, 2022

(54) ENDPOINT SECURITY

(71) Applicant: salesforce.com, inc., San Francisco, CA (US)

(72) Inventors: John Rice, Indianapolis, IN (US); Thomas B. Kashin, Indianapolis, IN (US)

(73) Assignee: salesforce.com, inc., San Francisco, CA (US)

( * ) Notice: Subject to any disclaimer, the term of this patent is extended or adjusted under 35 U.S.C. 154(b) by 309 days.

(21) Appl. No.: 16/225,718

(22) Filed: Dec. 19, 2018

(65) Prior Publication Data

US 2020/0137037 A1  Apr. 30, 2020

Related U.S. Application Data

(60) Provisional application No. 62/753,489, filed on Oct. 31, 2018.

(51) Int. Cl.
| | | |
|---|---|---|
| *H04L 29/06* | (2006.01) | |
| *H04L 9/06* | (2006.01) | |
| *G06F 16/955* | (2019.01) | |
| *G06F 21/40* | (2013.01) | |
| *H04L 29/08* | (2006.01) | |

(52) U.S. Cl.
CPC ........ *H04L 63/083* (2013.01); *G06F 16/9566* (2019.01); *G06F 21/40* (2013.01); *H04L 9/0643* (2013.01); *H04L 63/1483* (2013.01); *H04L 67/02* (2013.01); *H04L 2463/082* (2013.01)

(58) Field of Classification Search
CPC . H04L 63/08; H04L 63/1483; H04L 63/1491; H04L 2463/082; H04L 2463/141; H04L 67/02; H04L 9/0643; G06F 21/31; G06F 21/40; G06F 16/9566
See application file for complete search history.

(56) References Cited

U.S. PATENT DOCUMENTS

| | | | |
|---|---|---|---|
| 7,752,444 B2 * | 7/2010 | Leech | H04L 9/0844 713/171 |
| 8,875,255 B1 * | 10/2014 | Dotan | G06F 21/31 726/5 |
| 9,787,661 B2 * | 10/2017 | Naslund | G06F 21/602 |
| 9,847,994 B1 * | 12/2017 | Kelly | H04L 63/067 |
| 9,954,679 B2 * | 4/2018 | Nguyen | H04L 9/0841 |
| 10,277,711 B2 * | 4/2019 | Shribman | H04L 67/06 |

(Continued)

*Primary Examiner* — Hosuk Song
(74) *Attorney, Agent, or Firm* — Butzel Long

(57) ABSTRACT

Systems, devices, and techniques are disclosed for endpoint security. A user identifier entered into a first authentication screen used to access endpoints hosted on a server system may be received from a user computing device. The user identifier may be determined to be an invalid user identifier for the server system. The user identifier may be hashed to generate a hashed user identifier. An endpoint number may be determined as the hashed user identifier modulo a number of endpoint records assigned numbers on the server system. An endpoint URL may be retrieved from an endpoint record of the server system that is associated with a number equal to the endpoint number. The endpoint URL and data for a second authentication screen including a control for password entry may be sent to the user computing device. The endpoint URL may be displayed on the second authentication screen.

20 Claims, 11 Drawing Sheets

(56) References Cited

U.S. PATENT DOCUMENTS

2011/0154443 A1* 6/2011 Thakur .................. G06F 21/41
  726/3
2013/0117810 A1* 5/2013 Cheenath ................ H04L 63/08
  726/1

* cited by examiner

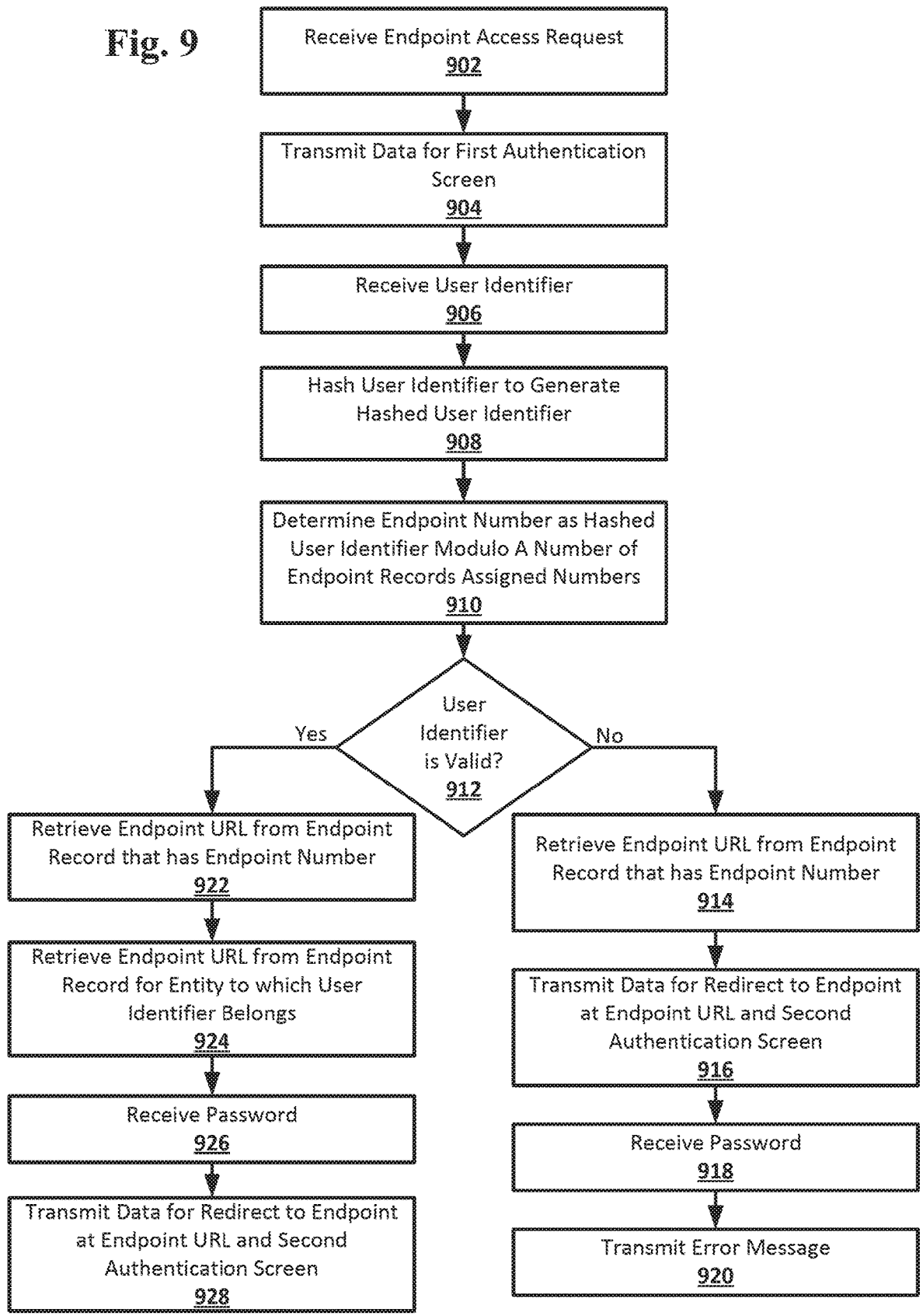

ENDPOINT SECURITY

BACKGROUND

Customers of a cloud computing server system may use endpoint URLs that point to endpoints in stacks of the cloud computing server system in their applications and web pages. Access to a customer's endpoints may be protected by authentication mechanisms that require a user identifier associated with the customer. The authentication may use separate screens for entry of the user identifier and entry of a password or other authenticating data. The screen for entry of the user identifier may redirect to an endpoint URL based on the user identifier entered. The endpoint URL may be displayed or otherwise ascertainable to the user who entered the user identifier. An attacker attempting to access endpoints on the cloud computing server system may use an enumeration attack, which may brute force enter user identifiers into the screen for entry of user identifiers to find user identifiers that redirect to endpoint URLs instead of resulting in errors, allowing the attacker to find valid user identifiers for the cloud computing server system.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 9 shows an example procedure suitable for endpoint security according to an implementation of the disclosed subject matter.

DETAILED DESCRIPTION

Figure 1:
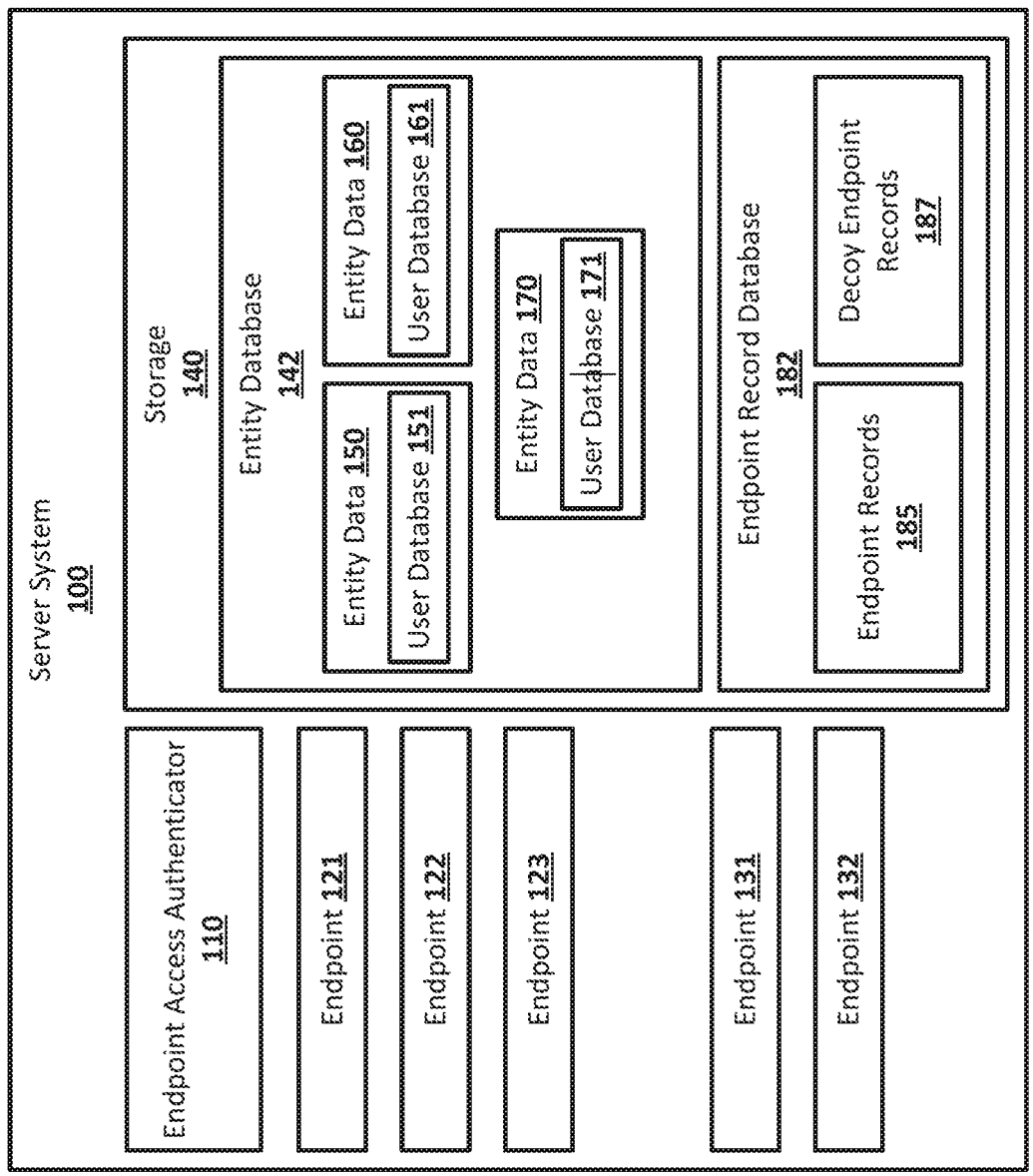
FIG. 1 shows an example system for endpoint security according to an implementation of the disclosed subject matter.

Techniques disclosed herein enable endpoint security. An entity that has resources hosted at endpoints of a cloud computing server system may have a number of associated user identifiers that may be used when accessing the endpoints. A user identifier may be used by the cloud computing server system in combination with a password or other type of authentication data to control access to an entity's endpoints on the cloud computing server system. The user identifier and password may be entered on separate screens, for example, separate web pages, during the log-in process. The user identifier may be entered on a first authentication screen displayed on a user computing device using a web browser or application. The cloud computing server system may determine which entity the user identifier is associated with and look up an endpoint record for that entity. The endpoint record may include an endpoint URL for the endpoint. The cloud computing server system may then redirect the user computing device to the endpoint URL from the endpoint record, which may result in a second authentication screen being displayed on the user computing device. A password or other authentication data may be entered on the second authentication screen and submitted to the cloud computing server system, which may determine if the password or other authentication data is correct before permitting the user computing device to access the endpoint at the endpoint URL. To prevent an enumeration attack in which an attacker attempts to determine a valid user identifier using brute force techniques, all invalid user identifiers may result in redirection to real endpoints. Additionally, decoy endpoint records with endpoint URLs that point to fake endpoints may be created and stored on the cloud computing server system. Real endpoint records used for redirection of invalid user identifiers and decoy endpoint records may be numbered consecutively. When an invalid user identifier, for example a user identifier that is not associated with any entity that uses the cloud computing server system, is entered on the first authentication screen, the invalid user identifier may be hashed using a hashing algorithm. The output of the hashing algorithm may have its modulo by the total number of real endpoint records used for redirection of invalid user identifiers and decoy endpoint records determined. The endpoint URL from the endpoint record, which may be a real endpoint record or decoy endpoint record, that is numbered with the same number as the modulo may be used when redirecting the user computing device to the second authentication screen. Because the user identifier is invalid, no password or authentication data entered in to the second authentication screen at the endpoint URL for a real or fake endpoint may be correct. The hashing algorithm and modulo function may ensure that the same invalid user identifier always causes redirection to the same endpoint URL from the same real or decoy endpoint record. This may help prevent an attacker from determining that the user identifier is invalid, as the user identifier does not result in an error when it is submitted on the first authentication screen, and multiple attempts to log-in with the user identifier will always lead to the same endpoint URL for a the same real or fake endpoint, rather than to random, and different, endpoint URLs. The attacker may be unable to distinguish a fake endpoint from a real endpoint, as both may present in the same manner to the attacker on the second authentication screen. The attacker may also be unable to tell that they have entered an invalid user identifier when they are directed to a real endpoint, as the second authentication screen may give no indication that the user identifier was invalid. Further, to prevent an attacker from using a timing attack in conjunction with an enumeration attack, valid user identifiers may also be subject to the hashing algorithm, modulo operation, and retrieval of the appropriate real or decoy endpoint record based on the result of modulo operation, and the cloud computing server system may wait until the hashing algorithm, modulo operation, and endpoint record retrieval has finished before redirecting the user computing device to the endpoint URL from the endpoint record for the entity associated with the user identifier. This may prevent an attacker from using the amount of time taken between the submission of a user identifier on the first authentication screen and the presentation of the second authentication screen to determine whether or not a user identifier is valid. If valid user identifiers were not hashed and the modulo operation and endpoint retrieval not performed, the second authentication screen could be presented noticeably faster when a valid user identifier is submitted than when an invalid user identifier is submitted due to the time needed to run the hashing algorithm, modulo operation, and retrieval of the endpoint record based on the modulo operation for the invalid user identifier.

A cloud computing server system may include any number of real and virtual computing devices with any suitable computing resources, including hardware resources such as processors and storage devices, software resources, and networking resources, at any number of geographic locations. Any number of entities may use a cloud computing server system. The entities may be, for example, individuals, groups, businesses, and organizations, which may be customers of an operator of the cloud computing server system. The entities may host and access data and software on the cloud computing server system through services offered by the cloud computing server system. Each service offered by the cloud computing server system to an entity may be available at an endpoint of the cloud computing server system to which the and may be accessible using an endpoint URL. Each entity may have a different endpoint URL for accessing the same service, as each entity may be given its own endpoints for the services offered by the cloud computing server system.

Endpoint URLs for the endpoints belonging to the entities that use the cloud computing server system may be stored in endpoint records. An endpoint record may include an endpoint URL and an identifier for the entity that the endpoint pointed to by the endpoint URL belongs to. The endpoint URL itself may include indications of the service made available at the endpoint pointed to by the endpoint URL and the entity that the endpoint belongs to. Endpoint records may allow for the cloud computing server system to determine which endpoint URL should be used when a user authenticates themselves to the cloud computing server system with a user identifier that belongs to one of the entities that uses the cloud computing server system. For example, a user may wish to access a service A provided by the cloud computing server system and may use a generic URL for service A that points to the first authentication screen of the cloud computing server system for service A, such as "serviceA.serversystem.com." The first authentication screen may be displayed on a user computing device. The first authentication screen may be, for example, a login screen. The user may enter a user identifier into the first authentication screen and submit the user identifier to the cloud computing server system. The cloud computing server system may determine which entity that uses the cloud computing server system the user identifier belongs to, for example, entity X. The cloud computing server system may then access the endpoint record for that entity's endpoint for service A, and retrieve that entity's endpoint URL for service A. The user computing device may be redirected to the entity's endpoint URL for service A, which may be, for example, "entityX_ID.serviceA.serversystem.com", and the second authentication screen may be displayed on the user computing device. The second authentication screen may be, for example, a password entry screen. The user may enter a password, or other authentication data, into the second authentication screen, and the cloud computing server system may authenticate the user identifier and password or authentication data before allowing the user access to the endpoint for service A for entity X.

Decoy endpoint record may be created and stored along with the endpoint records for entities that use the cloud computing server system. Instead of belonging to an entity that uses the cloud computing server system, decoy endpoint records may be assigned a number. Numbers may be assigned to decoy endpoint records consecutively. For example, if there are 5000 decoy endpoint records, the records may be numbered from 0 to 4999. Decoy endpoint records may include endpoint URLs. The endpoint URLs in decoy endpoint records may include data that is of the same form as an indication of an entity used in the endpoint URLs in other, non-decoy, endpoint records. The indication may not correspond to any entity that uses the cloud computing server system. For example, an alphanumeric string in an endpoint URL may provide an indication of the entity to which the endpoint pointed by the endpoint URL belongs. The alphanumeric string may be an identifier that the cloud computing server system has associated with the entity and may not be usable to identify the entity by parties outside of the cloud computing server system. For example, the alphanumeric string may be a hash of the entity's name, or a wholly numeric or alphanumeric string assigned to the entity in any suitable manner. An endpoint URL in a decoy endpoint record may include an alphanumeric string of the same format as the alphanumeric string in endpoint records for endpoints that belong to entities that use the cloud computing server system. The alphanumeric string in an endpoint URL in a decoy endpoint may not be associated with any entity that uses the cloud computing server system but may be in the same format as the alphanumeric strings that are associated with entities that use the cloud computing server system. This may prevent a party outside the cloud computing server system from being able to determine when an endpoint URL is from a decoy endpoint record.

The endpoint URLs in decoy endpoint records may lead to fake endpoints, which may be endpoints hosted on the cloud computing server system that do not belong to any entity that uses the cloud computing server system, do not provide access to any data or applications hosted on the cloud computing server system, and cannot be successfully logged-in to. Any suitable number of decoy endpoint records may be used by the cloud computing server system, and the decoy endpoint records and corresponding fake endpoints may be created in any suitable manner. In some implementations, the endpoint URLs in decoy endpoints may be partial URLs, which may be completed by adding the subdomain for the service a user is attempting to access with an invalid user identifier when the endpoint URL is retrieved from the decoy endpoint record. The number of fake endpoint on the cloud computing server system may correspond to the number of unique endpoint URLs used in the decoy endpoint records. For example, if there are 5000 decoy endpoint records, but only 1000 unique endpoint URLs in the decoy endpoint records, the cloud computing server system may have 1000 fake endpoints. In some implementations, the cloud computing server system may redirect all access attempts to any endpoint URL from a decoy endpoint record to the same endpoint.

In some implementations, different sets of decoy endpoint records may be used for different services. For example, if a cloud computing server system offers 18 services, 18 sets of decoy endpoint records may be created. The sets of decoy endpoint records may each include the same number of endpoints, which may be numbered from 0 to the number of decoy endpoint records in a set. The endpoint URLs in each decoy endpoint record with the same number across the sets may include the same indication of an entity that does not indicate any entity that uses the cloud computing server system. For example, all decoy endpoint records with the number 25 may include endpoint URLs with the same indication of an entity, for example, the same alphanumeric string that is not associated with any entity that uses the cloud computing server system. This may ensure the same invalid user identifier, when used to access different services, results in the same indication of an entity in the endpoint URL so that the invalid user identifier will appear to be a valid user identifier that belongs to a single entity.

In addition to numbers being assigned to decoy endpoint records, numbers may also be assigned to real endpoint records that belong to entities that use the cloud computing server system. These number may be assigned along with, or in lieu of, the numbers assigned to decoy endpoint records. For example, a cloud computing server system may have 2500 decoy endpoint records and 5000 real endpoint records. Numbers from 0 to 4999 may be assigned to the 2500 decoy endpoint records and to 2500 of the real endpoint records, in any order, so long as no two endpoint records are assigned the same number. The number assigned to a real endpoint record may be stored as part of the endpoint record, for example, in a column of the endpoint record that may be reserved for such a number assignment. The column may be, for example, a fake_id column, and may be present in all endpoint records, having a value of, for example, −1 in endpoint records that are not otherwise assigned a number from, for example, 0 to 4999. In some implementations, the cloud computing server system may not use any decoy endpoint records and may assign numbers only to real endpoint records. For example, the cloud computing server system may have 10000 real endpoint records, and numbers from 0 to 4999 may be assigned to 5000 of those 10000 real endpoint records.

A user that wishes to access an endpoint belonging to an entity that uses the cloud computing server system may need to authenticate themselves to the cloud computing server system. When the user accesses the cloud computing server system, for example, through a web browser or application running on a user computing device, the first authentication screen may be displayed to the user on the user computing device. The first authentication screen may display, or otherwise make ascertainable, a URL which may not be an endpoint URL, and may not include an indication of an entity. The user may enter and submit a user identifier to the cloud computing server system using the first authentication screen. The cloud computing server system may determine whether the submitted user identifier is a valid user identifier that belongs to one of the entities that use the cloud computing server system. For example, the cloud computing server system may attempt to look up the user identifier in a database that may associate valid user identifiers and the entities the valid user identifiers belong to.

If the user identifier is an invalid user identifier, the cloud computing server system may input the user identifier to a hashing algorithm. For example, the cloud computing server system may not find the user identifier submitted by the user on the first authentication screen in the database that associates valid user identifiers with the entities they belong to. The invalid user identifier may be hashed using the hashing algorithm, generating a hashed user identifier. The hashed user identifier may be a number. If the hashing algorithm outputs an alphanumeric or alphabetical string, rather than a number, the output of the hashing algorithm may be treated as a number in any suitable base. An endpoint number may be determined as the hashed user identifier modulo the total number of real endpoint records and decoy endpoint records assigned a number, or number of decoy endpoint records in a single set, on the cloud computing server system. The endpoint URL from the real or decoy endpoint record with the number that matches the endpoint number may be retrieved. The web browser or other application on the user computing device may be redirected to the endpoint pointed to by the endpoint URL from the endpoint record. The endpoint may be a real endpoint belonging to an entity that uses the cloud computing server system when the endpoint number is a number assigned to a real endpoint record and may be a fake endpoint when the endpoint number is a number assigned to a decoy endpoint record. The cloud computing server system may cause the second authentication screen to display on the user computing device. The endpoint URL from the real or decoy endpoint may also be displayed on the user computing device or may be otherwise ascertainable by the user.

For example, a user may be an attacker attempting an enumeration attack to determine valid user identifiers for the cloud computing server system. The user may access the first authentication screen at the URL "www.serversystem.com" on a user computing device. The user may submit a user identifier of "aabc" on the first authentication screen. The cloud computing server system may determine that user identifier "aabc" does not belong to any entity the uses the cloud computing server system and is therefore an invalid user identifier. The user identifier may be hashed using a hashing algorithm to generate a hashed user identifier. The hashing algorithm may output "27382305512952001". The cloud computing server system may use 5000 decoy endpoint records. The cloud computing server system may calculate the modulo of 27382305512952001 by 5000 to determine the endpoint number of 2001 for the user identifier "aabc". The cloud computing system may retrieve the endpoint URL from the decoy endpoint record that is numbered 2001. The endpoint URL may be, for example, "c1764n3.serversystem.com", where "c1764n3" may have the form of an indicator of an entity but may not be associated with any entity that uses the cloud computing server system. The user computing device may be redirected to the URL "c1764n3.serversystem.com", and the second authentication screen may be displayed on the user computing device. No password or other authentication data may allow the user to successfully authenticate themselves using the second authentication screen. Any attempt by the user to authenticate using the second authentication screen may result in failure, as there may be no password or other authentication data associated with the invalid user name submitted by the user on the first authentication screen. The user may be unable to tell that "c1764n3" is not actually an indication of an entity on the cloud computing server system, and therefore unable to tell that they have been directed to a fake endpoint and that the user identifier "aabc" is invalid.

As long as the hashing algorithm and number of real and decoy endpoint records that have been assigned numbers remains the same, any time the user identifier "aabc" is submitted using the first authentication screen at "www.serversystem.com", the computing device which submitted the user identifier may be redirected to "c1764n3.serversystem.com." The user identifier may be input to the same hashing algorithm, which may output the same hashed user identifier of "27382305512952001". The modulo of the hashed user identifier, as a decimal number, by 5000 may be calculated, resulting in an endpoint number of 2001 and the cloud computing server system redirecting the user computing device to the endpoint URL "c1764n3.serversystem.com" from the endpoint record that is numbered 2001. The same invalid user identifiers may always be directed to the same endpoint URL from the same endpoint record.

As another example, the cloud computing server system may have assigned numbers to 5000 real endpoint records. After hashing the user identifier "aabc" and calculating the modulo by 5000 of the result of hashing as 2001, the cloud computing server system may retrieve the endpoint URL from the real endpoint record that is numbered 2001. This endpoint record may belong to an entity that uses the cloud computing server system, and the endpoint URL from this endpoint record may point to a real endpoint that may be used by the entity to access services or data. The endpoint URL may be, for example, "rk80q290.serversystem.com", where "rk80q290" may be the indicator of an entity that uses the cloud computing server system. The user computing device may be redirected to the URL "rk80q290.serversystem.com", and the second authentication screen may be displayed on the user computing device. No password or other authentication data may allow the user to successfully authenticate themselves using the second authentication screen. Any attempt by the user to authenticate using the second authentication screen may result in failure, as there may be no password or other authentication data associated with the invalid user name submitted by the user on the first authentication screen. The user may be unable to tell that the user identifier "aabc" is invalid, as they will have been redirected to an actual endpoint. The user may also be unable to distinguish between actual endpoints and fake endpoints. As long as the number of real endpoint records that have been assigned numbers remains the same, the user identifier "aabc" may always be result in the user computing device being redirected to the URL"rk80q290.serversystem.com", preventing the user from determining that "aabc" is an invalid user identifier.

If a user identifier submitted using the first authentication screen is a valid user identifier, the cloud computing server system may input the user identifier to the hashing algorithm. For example, the cloud computing server system may find the user identifier submitted by the user on the first authentication screen in the database that associates valid user identifiers with the entities they belong to. The valid user identifier may still be hashed using the hashing algorithm. After the hashing algorithm has finished running on the valid user identifier, the modulo operation may be performed to generate the endpoint number for the user identifier, and the real or decoy endpoint record numbered with the endpoint number may be retrieved. The user computing device may then be redirected to an endpoint URL retrieved from an endpoint record for the entity that the user identifier belongs to, and not to the endpoint URL from the endpoint record numbered with the endpoint number. The user may then be able to submit a password or other authentication data on the second authentication screen. The cloud computing server system may verify that the password or authentication data is correct for the valid user identifier before permitting access to the service available at the endpoint pointed to by the endpoint URL. This may ensure that there is minimal variation between the times taken to display the second authentication screen on a user computing device for valid and invalid user identifiers, preventing the use of timing attacks to distinguish between valid and invalid user identifiers.

FIG. 1 shows an example system for endpoint security according to an implementation of the disclosed subject matter. A server system 100 may include any suitable computing devices, such as, for example, a computer 20 as described in FIG. 10 or component thereof. The server system 100 may be implemented on a laptop, a desktop, an individual server, a server cluster, a server farm, or a distributed server system, or can be implemented as a virtual computing device or system, or any suitable combination of physical and virtual systems. The server system 100 can be part of a computing system and network infrastructure or can be otherwise connected to the computing system and network infrastructure, including a larger server network which can include other server systems. The server system 100 may include, for example, any number of server systems which may be in communication with each other and may communicate in any suitable manner. For example, the server systems of the server system 100 may be connected through any suitable network, which may be any suitable combination of LANs and WANs, including any combination of private networks and the Internet. The server system 100 may be a cloud computing server system for a cloud computing service. The server system 100 may include an endpoint access authenticator 110, endpoints 121, 122, 123, 124, 131, and 132, and a storage 140. The storage 140 may include an entity database 142 and an endpoint record database 182.

The endpoint access authenticator 110 may be any suitable hardware and software on the server system 100 for determining whether to grant a request from another computing device for access to an endpoint on the server system 100. The endpoint access authenticator 110 may look up a user identifier submitted using the first authentication screen by another computing device in the user databases 151, 161, and 171 of the entity database 142 to determine if the user identifier is valid and belongs to an entity or is in invalid. When a user identifier received by the endpoint access authenticator 110 is invalid, for example, is not found in any of the user databases 151, 161, and 171, the endpoint access authenticator 110 may generate a hashed user identifier by inputting the user identifier to a hashing algorithm. The endpoint access authenticator 110 may then determine an endpoint number as the modulo of the hashed user identifier by the number of real and decoy endpoint records assigned numbers and stored in endpoint records 185 and decoy endpoint records 187 in an endpoint record database 142. The endpoint access authenticator 110 may retrieve an endpoint URL for a from the real or decoy endpoint record whose number matches the endpoint number. The endpoint access authenticator 110 may redirect the computing device that submitted the user identifier to the endpoint pointed to by the endpoint URL from the real or decoy endpoint record and display the second authentication screen on that computing device. The endpoint access authenticator 110 may generate an error message for any password or authentication data submitted using the second authentication screen for the endpoint.

When a user identifier received by the endpoint access authenticator 110 is valid, for example, is found in one of the user databases 151, 161, and 171, the endpoint access authenticator 110 may generate a hashed user identifier by inputting the user identifier to a hashing algorithm. The endpoint access authenticator may use the hashed user identifier to determine an endpoint number. The endpoint access authenticator 110 may retrieve an endpoint record from the endpoint records 185 based on the entity that the submitted user identifier belongs to, while also retrieving an endpoint record based on the endpoint number. The endpoint access authenticator 110 may redirect the computing device that submitted the user identifier to the endpoint pointed to by the endpoint URL from the endpoint record retrieved based on the entity that the submitted user identifier belongs to and display the second authentication screen on that computing device after the hashing algorithm, modulo operation, and retrieval of an endpoint record based on the endpoint number have finished. The endpoint access authenticator 110 may then verify any password or authentication data submitted on the second authentication screen for the endpoint and permit the computing device to access the endpoint if the verification is successful.

The endpoints 121, 122, and 123 may be endpoints for services made available by the server system 100 and may belong to different entities. For example, the endpoint 121 may belong to a first entity, the endpoint 122 may belong to a second entity, and the endpoint 123 may belong to a third entity. The endpoints 121, 122, and 123 may be accessible at endpoint URLs which may be stored in endpoint records of the endpoint records 185 in the endpoint record database 182. The endpoints 121, 122, and 123 may offer services and data that may be accessed, for example, through API requests.

The endpoints 131 and 132 may be fake endpoints used by the server system 100. The endpoints 131 and 132 may, for example, not belong to any of the entities that have endpoints on the server system 100. The endpoints 131 and 132 may be accessible at endpoint URLs which may be stored in decoy endpoint records of the decoy endpoint records 187 in the endpoint record database 182. The endpoints 131 and 132 may not offer any services or access to any data. Accessing the endpoint URLs for the endpoints 131 and 132 may result in the displaying of the second authentication screen. No successful authentication may be possible when the second authentication screen is displayed through use of an endpoint URL for a fake endpoint such as the endpoints 131 and 132.

The storage 140 may be any suitable combination of hardware and software for the storage of data on the server system 100. For example, the storage 140 may include hard drives, solid state drives, random access memory, or other forms of data storage which may be persistent or non-persistent. The storage 140 may store an entity database 142 and an endpoint record database 182. The entity database 142 may store data about the entities, for example, individuals, groups, organizations, and businesses, that use the server system 100, for example, as customers of a cloud computing service that operates the server system 100. The entity database 142 may, for example, store entity data 150, entity data 160 and entity 170, which may be the separate entity data for three separate entities that use the server system 100. The entity data 150 may include a user database 151, which may be a database of user identifiers, or usernames, and associated passwords for users associated with the entity whose data is stored as the entity data 150. The entity data 160 may include a user database 161, which may be a database of user identifiers, or usernames, and associated passwords for users associated with the entity whose data is stored as the entity data 160. The entity data 170 may include a user database 171, which may be a database of user identifiers, or usernames, and associated passwords for users associated with the entity whose data is stored as the entity data 170.

The endpoint record database 182 may store the endpoint records 185 and the decoy endpoint records 187. The endpoint records 185 may be endpoint records for endpoints on the server system 100, such as the endpoints 121, 122, and 123, that belong to entities that use the server system 100. An endpoint record in the endpoint records 185 may include an endpoint URL that points to an endpoint on the server system 100 and an indication of the entity to which the endpoint belongs. The decoy endpoint records 187 may be endpoint records for endpoints on the server system 100 that are fake endpoints, such as the endpoints 131 and 132, and do not belong to any entity that has endpoints on the server system 100. A decoy endpoint record in the decoy endpoint records 187 may include an endpoint URL that points to a fake endpoint on the server system 100, including an indication of an entity that is in the same form as an indication of an entity in an endpoint record from the endpoint records 185 but is not associated with and does not indicate any entity that uses the server system 100. Both the real endpoint records of the endpoint records 185 and decoy endpoint records of the decoy endpoint records 187 may be assigned numbers that may correspond to the endpoint numbers generated by the modulo operation. The numbers may go sequentially from 0 up to any suitable number, and any combination of real endpoint records and decoy endpoint records may be assigned numbers. For example, in some implementations the server system 100 may include no decoy endpoint records, and only real endpoint records may be assigned numbers. In some implementations, both real endpoint records and decoy endpoint records may be assigned numbers. In some implementations, only decoy endpoint records may be assigned numbers.

Figure 2:
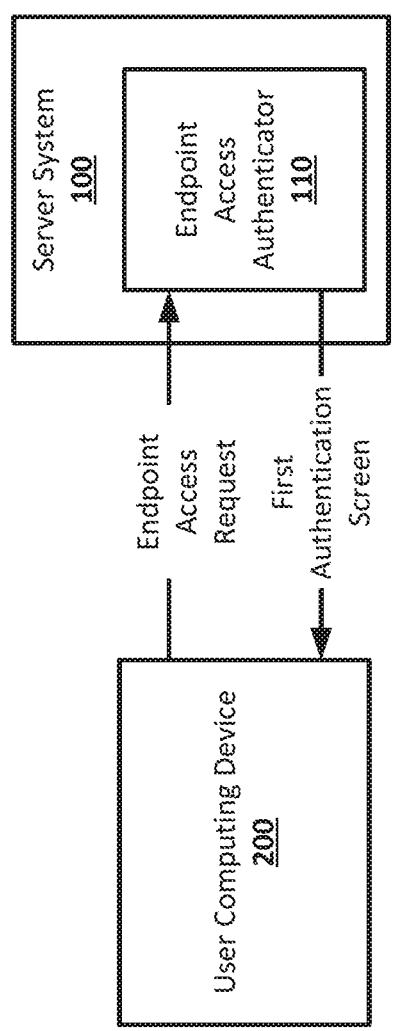
FIG. 2 shows an example arrangement for endpoint security according to an implementation of the disclosed subject matter.

FIG. 2 shows an example arrangement for endpoint security according to an implementation of the disclosed subject matter. A user computing device 200 may be any suitable computing device, such as, for example, a computer 20 as described in FIG. 10 or component thereof. The user computing device 200 may be implemented on a laptop, a desktop, an individual server, a server cluster, a server farm, or a distributed server system, or can be implemented as a virtual computing device or system, or any suitable combination of physical and virtual systems. The user computing device 200 can be part of a computing system and network infrastructure or can be otherwise connected to the computing system and network infrastructure, including a larger server network which can include other server systems. The user computing device 200 may include, for example, any number of server systems which may be in communication with each other and may communicate in any suitable manner. For example, the server systems of the user computing device 200 may be connected through any suitable network, which may be any suitable combination of LANs and WANs, including any combination of private networks and the Internet. The user computing device 200 may be a computing device used by a party that wishes to access an endpoint on the server system 100. For example, the user computing device 200 may be used by an attacker attempting an enumeration attack on the server system 100.

The user computing device 200 may submit an endpoint access request to the endpoint access authenticator 110 of the server system 100. The endpoint access request may be in the form of, for example an HTTP request for a web page at a URL for the server system 100, or a request from an application, for example, a smartphone application, for a connection to the server system 100. The endpoint access authenticator 110 may provide data for the first authentication screen to the user computing device 200. For example, the endpoint access authenticator 110 may provide the user computing device 200 with a web page hosted at the location pointed to by a URL for the server system 100. The first authentication screen may provide controls, such as a text entry box and an activation button, the may allow a user of the user computing device 200 to enter a user identifier and submit the user identifier to the server system 100.

Figure 3:
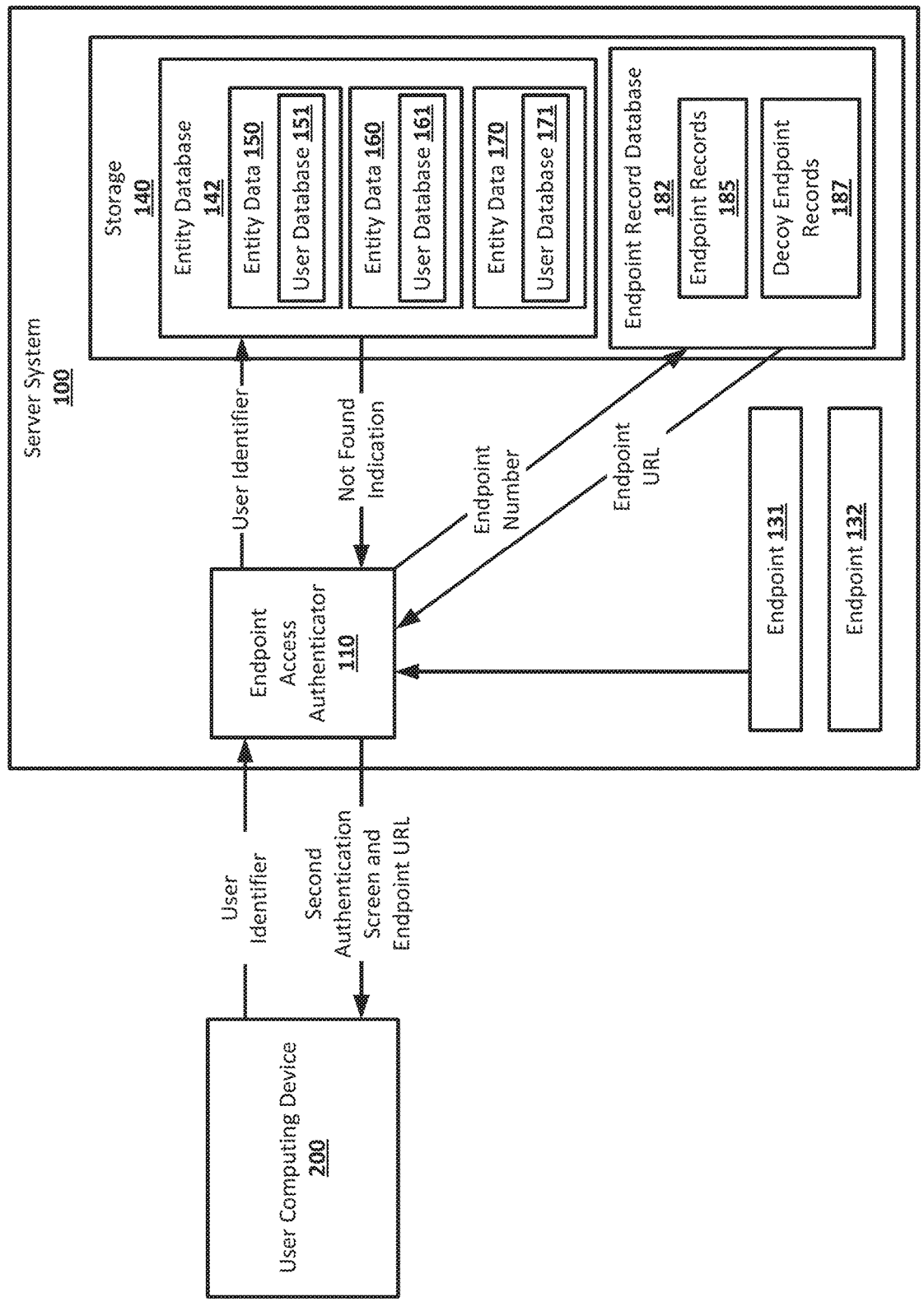
FIG. 3 shows an example arrangement for endpoint security according to an implementation of the disclosed subject matter.

FIG. 3 shows an example arrangement for endpoint security according to an implementation of the disclosed subject matter. The endpoint access authenticator 110 may receive a user identifier from the user computing device 200 submitted using the first authentication screen. The endpoint access authenticator 110 may look up the user identifier received from the user computing device 200 in the user databases 151, 161, and 171 of the entity database 142 to determine whether the user identifier belongs to an entity and is valid or does not belong to an entity and is invalid. The endpoint access authenticator 110 may determine that the user identifier received from the computing device 200 is not found in any of the user databases 151, 161, and 171, indicating that the user identifier does not belong to any entity that uses the server system 100 and is invalid.

The endpoint access authenticator 110 may input the user identifier to a hashing algorithm, generating a hashed user identifier. The hashed user identifier may be, for example, a decimal number, or may be an alphanumeric string that may be converted to a decimal number. The endpoint access authenticator 110 may determine an endpoint number as the modulo of the hashed user identifier by the number of real and decoy endpoint records that are assigned numbers in the endpoint record database 182. The endpoint access authenticator 110 may retrieve the endpoint URL from the real or decoy endpoint record that has the same number as the endpoint number. For example, if numbers are assigned to 5000 real and decoy endpoint records, and the endpoint number determined by the endpoint access authenticator 110 is 450, the endpoint access authenticator 110 may retrieve the endpoint URL from the endpoint record with the number 450 from among the endpoint records 185 and decoy endpoint records 187 in the endpoint record database 182.

The endpoint access authenticator 110 may redirect the user computing device 200 to the endpoint 131 pointed to by the endpoint URL from the real or decoy endpoint record. Data for the second authentication screen may be provided to the user computing device 200. For example, the user computing device 200 may be provided with a web page hosted at the endpoint 131 pointed to by the endpoint URL retrieved from a decoy endpoint record with the same number as the endpoint number. The second authentication screen may provide controls, such as a text entry box and an activation button, the may allow a user of the user computing device 200 to enter a password or other authentication data and submit the password or other authentication data to the server system 100. The second authentication screen may also display the endpoint URL from the decoy endpoint record, or the endpoint URL may be otherwise ascertainable by the user computing device 200.

Figure 4:
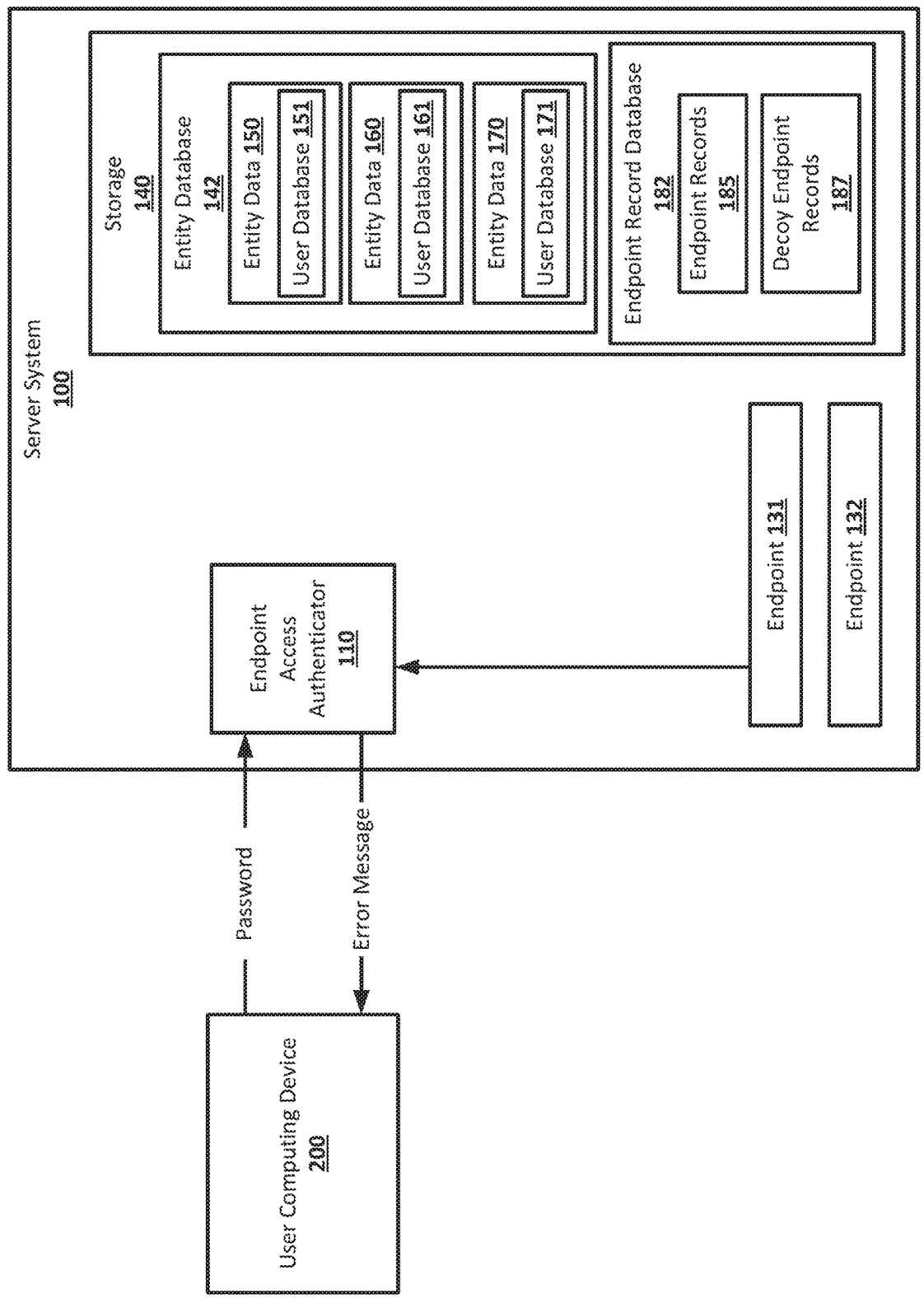
FIG. 4 shows an example arrangement for endpoint security according to an implementation of the disclosed subject matter.

FIG. 4 shows an example arrangement for endpoint security according to an implementation of the disclosed subject matter. Any password or authentication data submitted to the server system 100 from the user computing device 200 using the second authentication screen after the user computing device 200 has been redirected to the endpoint 131 may result in an error message. The user identifier submitted by the user computing device 200 on the first user authentication screen may be invalid. No password or other authentication data may be able to successfully authenticate an invalid user identifier to the server system 100. The endpoint 131 may be fake endpoint, and there may be no service or data that may be accessible to the user computing device 200 through the endpoint 131. Because the second authentication screen displays, or otherwise makes available, the endpoint URL from the decoy endpoint record, the user may be unable to determine that they have been directed to a fake endpoint, as the endpoint URL from the decoy endpoint record may have the same form as endpoint URL from an endpoint record for an endpoint such as the endpoint 121. The endpoint URL from the decoy endpoint record may, for example, include an alphanumeric string that has the same form as an indication of an entity, but is not associated with any entity has an endpoint on the server system 100. This may prevent the user from determining that the user identifier submitted by the user computing device 200 is invalid.

If the endpoint record with same number as the endpoint number were a real endpoint record, for example, from the endpoint records 185, the user computing device 200 may be redirected using the endpoint URL from the real endpoint record to a real endpoint, such as the endpoint 121. Because the user identifier submitted by the user computing device 200 on the first user authentication screen may be invalid, no password or authentication data may be able to successfully authenticate an invalid user identifier to the server system 100, and the user may be unable to access any data or services provided by the endpoint 121. The user may be unable to tell whether they have been redirected to a real endpoint or fake endpoint and may be unable to determine that the user identifier is invalid.

Figure 5:
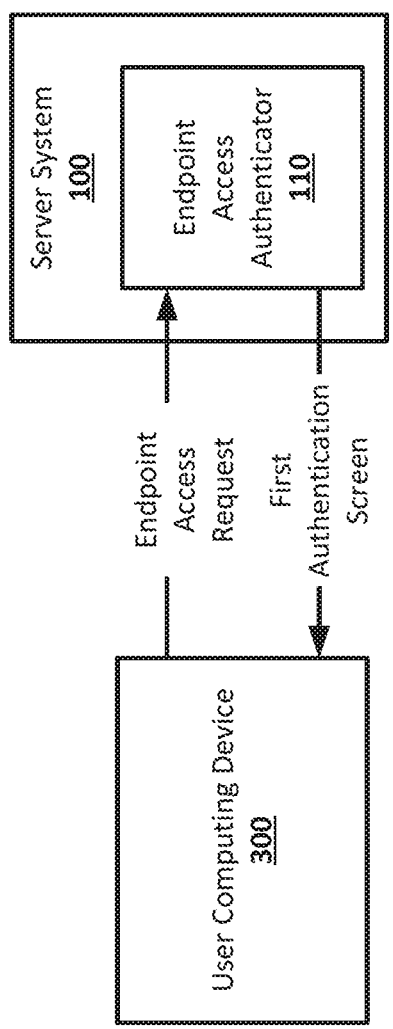
FIG. 5 shows an example arrangement for endpoint security according to an implementation of the disclosed subject matter.

FIG. 5 shows an example arrangement for endpoint security according to an implementation of the disclosed subject matter. A user computing device 300 may be any suitable computing device, such as, for example, a computer 20 as described in FIG. 10 or component thereof. The user computing device 300 may be implemented on a laptop, a desktop, an individual server, a server cluster, a server farm, or a distributed server system, or can be implemented as a virtual computing device or system, or any suitable combination of physical and virtual systems. The user computing device 300 can be part of a computing system and network infrastructure or can be otherwise connected to the computing system and network infrastructure, including a larger server network which can include other server systems. The user computing device 300 may include, for example, any number of server systems which may be in communication with each other and may communicate in any suitable manner. For example, the server systems of the user computing device 300 may be connected through any suitable network, which may be any suitable combination of LANs and WANs, including any combination of private networks and the Internet. The user computing device 300 may be a computing device used by a party that wishes to access an endpoint on the server system 100. For example, the user computing device 300 may be a computing device used by a business organization that is an entity that has endpoints on the server system 100.

The user computing device 300 may submit an endpoint access request to the endpoint access authenticator 110 of the server system 100. The endpoint access request may be in the form of, for example an HTTP request for a web page at a URL for the server system 100, or a request from an application, for example, a smartphone application, for a connection to the server system 100. The endpoint access authenticator 110 may provide data for the first authentication screen to the user computing device 300. For example, the endpoint access authenticator 110 may provide the user computing device 300 with a web page hosted at the location pointed to by a URL for the server system 100. The first authentication screen may provide controls, such as a text entry box and an activation button, the may allow a user of the user computing device 300 to enter a user identifier and submit the user identifier to the server system 100.

Figure 6:
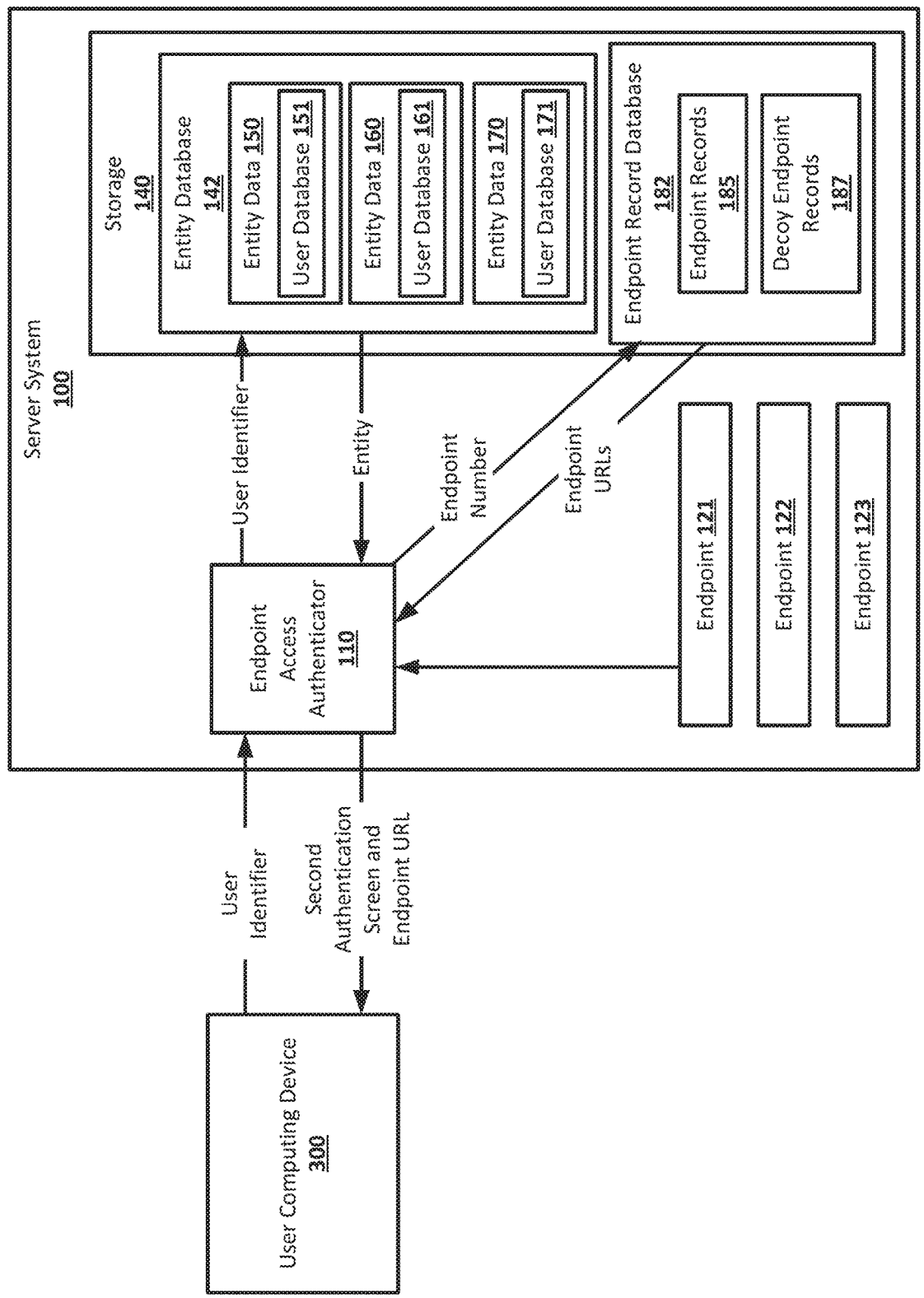
FIG. 6 shows an example arrangement for endpoint security according to an implementation of the disclosed subject matter.

FIG. 6 shows an example arrangement for endpoint security according to an implementation of the disclosed subject matter. The endpoint access authenticator 110 may receive a user identifier from the user computing device 300 submitted using the first authentication screen. The endpoint access authenticator 110 may look up the user identifier received from the user computing device 300 in the user databases 151, 161, and 171 of the entity database 142 to determine whether the user identifier belongs to an entity and is valid or does not belong to an entity and is invalid. The endpoint access authenticator 110 may find the user identifier received from the computing device 300 in one of the user databases, for example, in the user database 151, indicating that the user identifier is valid and belongs to the entity for which the entity data 150 is stored in the entity database 142.

The endpoint access authenticator 110 may input the user identifier to a hashing algorithm, generating a hashed user identifier. The hashed user identifier may be, for example, a decimal number, or may be an alphanumeric string that may be converted to a decimal number. The endpoint access authenticator 110 may determine an endpoint number as the modulo of the hashed user identifier by the number of real and decoy endpoint records that are assigned numbers in the endpoint record database 182. The endpoint access authenticator 110 may retrieve the endpoint URL from the real or decoy endpoint record that has the same number as the endpoint number. The endpoint access authenticator 110 may then retrieve the endpoint URL from the endpoint record of the endpoint records 185 that belongs to the entity for which the entity data 150 is stored in the entity database 142.

The endpoint access authenticator 110 may redirect the user computing device 300 to the endpoint 121 pointed to by the endpoint URL from the endpoint record. Data for the second authentication screen may be provided to the user computing device 300. For example, the user computing device 300 may be provided with a web page hosted at the endpoint 121 pointed to by the endpoint URL retrieved from the endpoint record that belongs to the entity for which the entity data 150 is stored in the entity database 142. The second authentication screen may provide controls, such as a text entry box and an activation button, the may allow a user of the user computing device 300 to enter a password or other authentication data and submit the password or other authentication data to the server system 100. The second authentication screen may also display the endpoint URL from the endpoint record, or the endpoint URL may be otherwise ascertainable by the user computing device 300.

Figure 7:
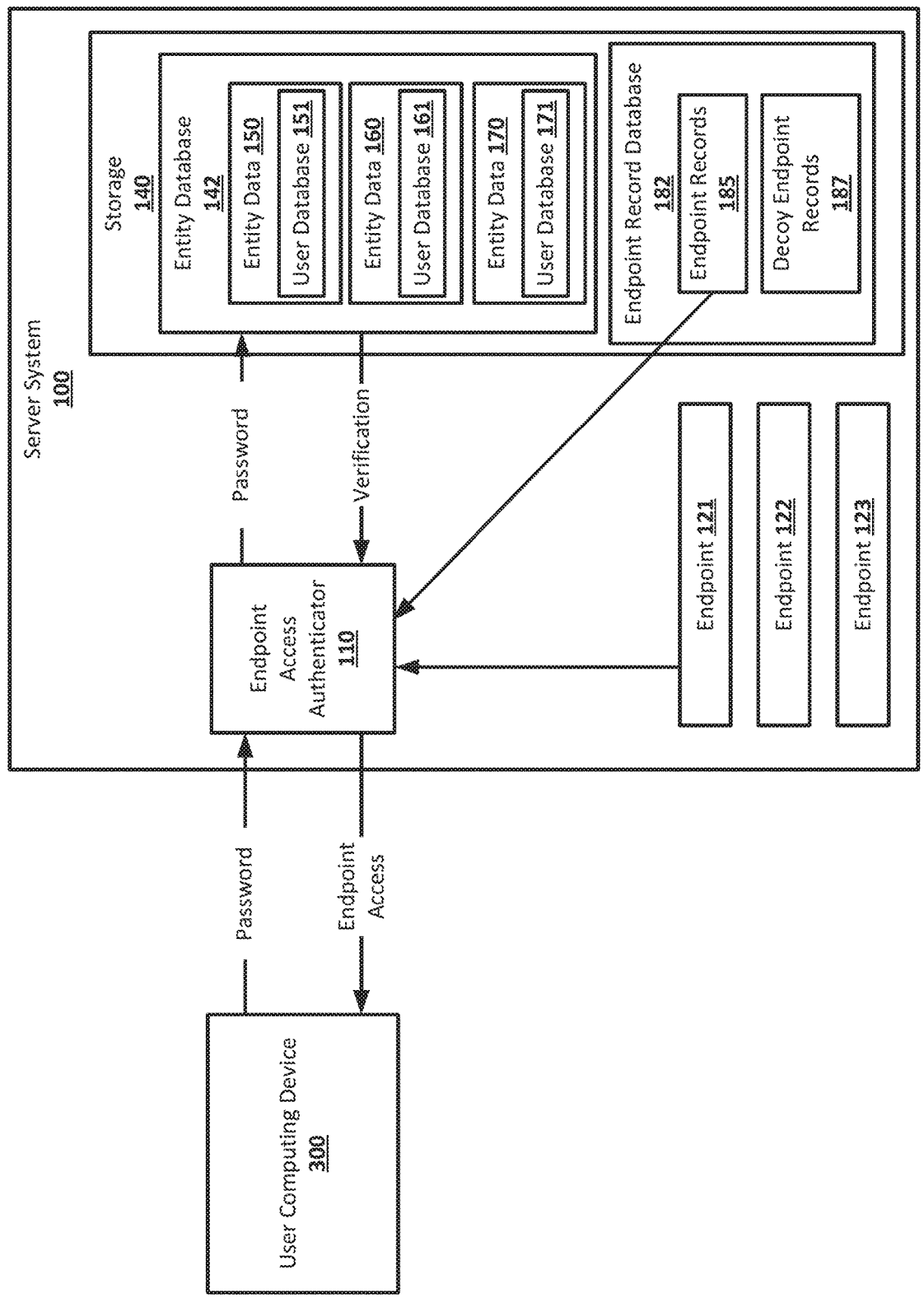
FIG. 7 shows an example arrangement for endpoint security according to an implementation of the disclosed subject matter.

FIG. 7 shows an example arrangement for endpoint security according to an implementation of the disclosed subject matter. A password may be submitted to the server system 100 by the user computing device 300 using the second authentication screen after the user computing device 300 has been redirected to the endpoint 121. The endpoint access authenticator 110 may authenticate the password in any suitable manner. For example, the entity data 150 may include data that may be used to authenticate passwords for user identifiers that are in the user database 151. When the endpoint access authenticator 110 has authenticated the password, verifying that the password is correct for the submitted user identifier, the endpoint access authenticator 110 may allow the user computing device 300 to access the services or data provided by the endpoint 121. The user computing device 300 may be redirected to a screen that allows for interaction with the endpoint 121.

Figure 8A:
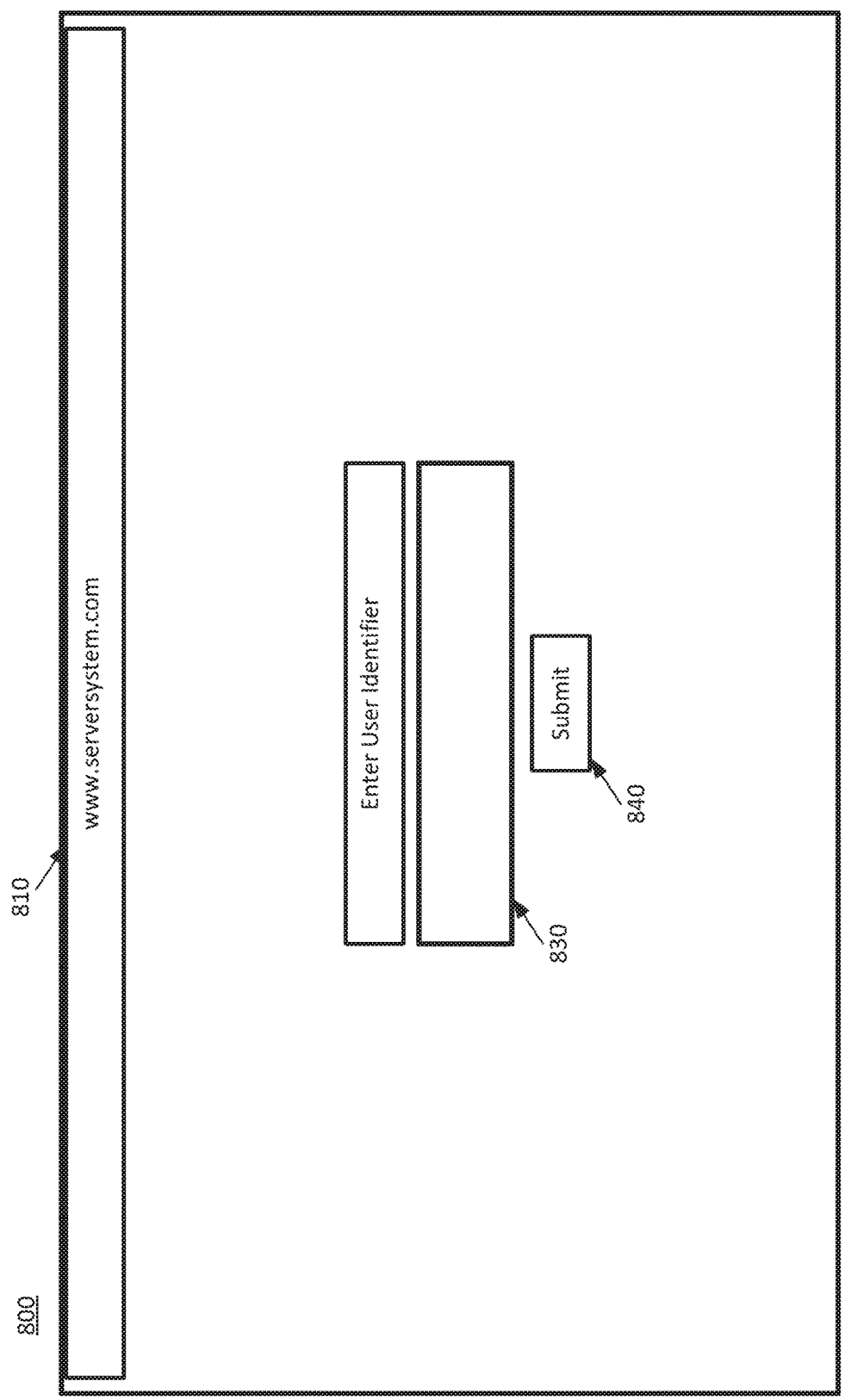
FIG. 8A shows an example user interface for endpoint security according to an implementation of the disclosed subject matter.

FIG. 8A shows an example user interface for endpoint security according to an implementation of the disclosed subject matter. A first authentication screen 800 may allow a user to submit a user identifier to the server system 100 to attempt to authenticate the user to the server system 100 and gain access to an endpoint. The first authentication screen 800 may be, for example, a web-based interface accessed through any suitable web browser and hosted on the server system 100, or may be, for example, an application-based interface which may be accessed using, for example, a client application that may connect to the server system 100.

The first authentication screen 800 may be display on a user computing device, such as the user computing device 200 or 300, and may include an address bar 810, which may indicate the URL that points to the location on the server system 100 that hosts the data for the first authentication screen 800 or is connected to by the first authentication screen 800. A text box 830 may allow for a user to input a user identifier, and a submit control 840 may allow the user to submit the user identifier entered into the text box 830 to the server system 100.

Figure 8B:
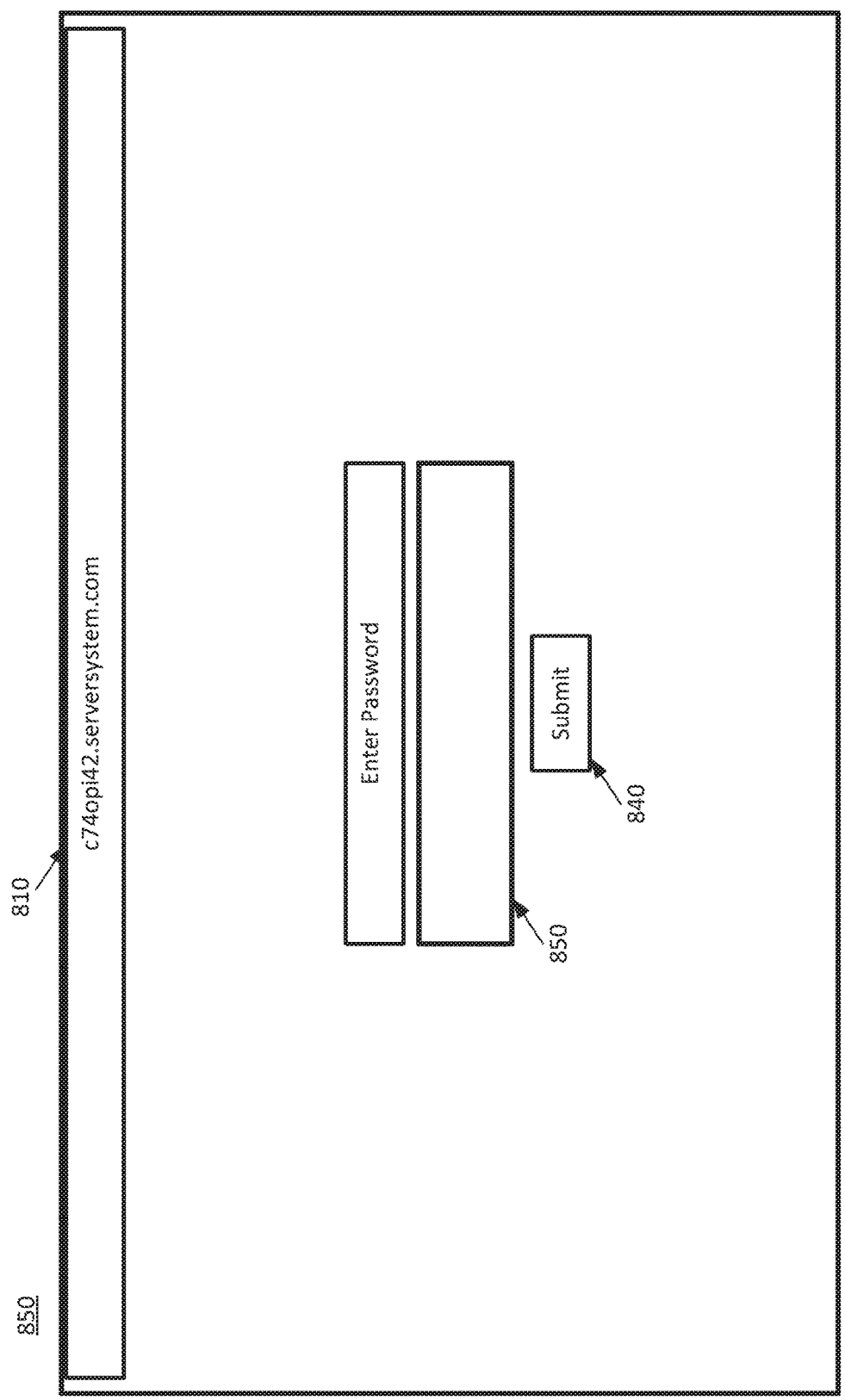
FIG. 8B shows an example user interface for endpoint security according to an implementation of the disclosed subject matter.

FIG. 8B shows an example user interface for endpoint security according to an implementation of the disclosed subject matter. A second authentication screen 850 may allow a user to submit a password or other authentication data to the server system 100 to attempt to authenticate the user to the server system 100 and gain access to an endpoint. The second authentication screen 850 may be, for example, a web-based interface accessed through any suitable web browser and hosted on the server system 100, or may be, for example, an application-based interface which may be accessed using, for example, a client application that may connect to the server system 100. The user computing device may be redirected to an endpoint that hosts the second authentication screen 850 after submitting a user identifier using the first authentication screen 800.

The second authentication screen 850 may be display on a user computing device, such as the user computing device 200 or 300, and may include the address bar 810, which may indicate the URL that points to the location on the server system 100 that hosts the data for the second authentication screen 850 or is connected to by the second authentication screen 850. A text box 850 may allow for a user to input a password, and the submit control 840 may allow the user to submit the password entered into the text box 840 to the server system 100.

The endpoint URL displayed in the address bar 810 on the second authentication screen 850 may include an alphanumeric string that may be an indication of the entity that the endpoint being accessed belongs to, or that may resemble such an indication when the endpoint URL is from a decoy endpoint record and the endpoint being accessed is a fake endpoint. The alphanumeric string in the endpoint URL in the address bar 810 may have the same form on the second authentication screen 850 whether the endpoint URL is from an endpoint record or a decoy endpoint record, so that an attacker may be unable to tell whether the user identifier they entered on the first authentication screen 800 is a valid or invalid user identifier.

FIG. 9 shows an example procedure suitable for endpoint security according to an implementation of the disclosed subject matter. At 902, an endpoint access request may be received. For example, the endpoint access authenticator 110 may receive a request from a user computing device, such as the user computing device 200 or 300, to access an endpoint on the server system 100. The request may be made by, for example, the user computing device using a URL for the server system 100.

At 904, the data may be transmitted for a first authentication screen. For example, the endpoint access authenticator 110 may transmit data for the first authentication screen 800 to the user computing device, such as the user computing device 200 or 300, from which the request to access an endpoint on the server system 100 was received. The data for the first authentication screen 800 may be, for example, a web page to be rendered by a web browser or may be data to be displayed within a client application.

At 906, a user identifier may be received. For example, the endpoint access authenticator 110 may receive a user identifier submitted using the first authentication screen 800 from the user computing device, such as the user computing device 200 or 300, from which the request to access an endpoint on the server system 100 was received.

At 908, the user identifier may be hashed to generate a hashed user identifier. For example, the endpoint access authenticator 110 may input the user identifier that was submitted using the first authentication screen 800 to a hashing algorithm. The hashing algorithm may output a hashed user identifier, which may be a decimal number or an alphanumeric string which may be representable as a decimal number.

At 910, an endpoint number may be determined as the hashed user identifier modulo a number of endpoint records assigned numbers. For example, the endpoint access authenticator 110 may determine the modulo of the hashed user identifier by a number of real and decoy endpoint records of the endpoint records 185 and the decoy endpoint records 187 in the endpoint record database 182 that have been assigned numbers. The result may be the endpoint number for the user identifier that was hashed.

At 912, if the user identifier is valid user identifier, flow may proceed to 918. Otherwise, if the user identifier is an invalid user identifier, flow may proceed to 916. For example, the endpoint access authenticator 110 may look up the received user identifier in the entity database 142 to determine if the user identifier is in any of the user databases 151, 161, and 171. If the user identifier is found in any of the user databases 151, 161, and 171, the user identifier may be valid. If the user identifier is not found in any of the user databases 151, 161, and 171, the user identifier may be invalid.

At 914, an endpoint URL may be retrieved from an endpoint record that has the endpoint number. For example, the endpoint access authenticator 110 may retrieve from the endpoint record database 182 an endpoint URL that is stored in a real or decoy endpoint record that is numbered with the endpoint number for the user identifier. For example, if the endpoint number is 600, the endpoint URL may be retrieved from whichever real or decoy endpoint record is numbered 600. The endpoint URL from the endpoint record may point to a fake endpoint, such as the endpoint 131, or a real endpoint, such as the endpoint 121 on the server system 100.

At 916, data for redirection to an endpoint at the endpoint URL and the second authentication screen may be transmitted. For example, the endpoint access authenticator 110 may connect the user computing device that submitted the user identifier, for example, user computing device 200 which may be conducting an enumeration attack, to the endpoint 131, which may be a fake endpoint pointed to be the endpoint URL retrieved from a decoy endpoint record numbered with the endpoint number. The endpoint access authenticator 110 may redirect the user computing device 200 to the endpoint 131, for example, redirecting a web browser using the endpoint URL. Data for the second authentication screen 850 may be transmitted to the user computing device for display to the user. If the endpoint record number with the endpoint number is a real endpoint record, the user computing device 200 may be redirected to a real endpoint such as the endpoint 121.

At 918, a password may be received. For example, the endpoint access authenticator 110 may receive a password submitted by the user computing device 200 using the second authentication screen 850.

At 920, an error message may be transmitted. For example, the endpoint access authenticator 110 may transmit an error message in response to receiving any password or other authentication data from the user computing device 200 while connected to the endpoint 131. The user identifier submitted by the user computing device 200 may be invalid, and there may be no password or other authentication data the can be submitted after submission of the invalid user identifier that will result in the user computing device 200 being permitted further access to the server system 100 even if the user computing device 200 has been redirected to a real endpoint such as the endpoint 121. Additionally, the endpoint 131 may be a fake endpoint which may make available no services or data.

At 922 an endpoint URL may be retrieved from an endpoint record that has the endpoint number. For example, the endpoint access authenticator 110 may retrieve from the endpoint record database 182 an endpoint URL that is stored in a real or decoy endpoint record that is numbered with the endpoint number for the user identifier. For example, if the endpoint number is 600, the endpoint URL may be retrieved from whichever real or decoy endpoint record is numbered 600. The endpoint URL from the endpoint record may point to a fake endpoint, such as the endpoint 131, or a real endpoint, such as the endpoint 121 on the server system 100. The valid user identifier may be subjected to hashing and the modulo operation, and the endpoint URL may be retrieved from the endpoint record with the endpoint number, in the same manner as an invalid user identifier in order to prevent a timing attack being used to differentiate valid and invalid user identifiers.

At 924, an endpoint URL may be retrieved from an endpoint record that for the entity to which the user identifier belongs. For example, the endpoint access authenticator 110 may have determined that user identifier is valid and belongs to an entity that has endpoints on the server system 100. The endpoint access authenticator 100 may retrieve from an endpoint URL from an endpoint record of the endpoint records 185 that belongs to the entity to which the user identifier belongs.

At 926, a password may be received. For example, the endpoint access authenticator 110 may receive a password submitted by the user computing device 300 using the second authentication screen 850.

At 928, data for redirection to an endpoint at the endpoint URL and the second authentication screen may be transmitted. For example, the endpoint access authenticator 110 may connect the user computing device that submitted the user identifier, for example, user computing device 300, to the endpoint 121, which may be an endpoint of the server system 100 that offers access to services or data. The endpoint access authenticator 110 may redirect the user computing device to the endpoint 121, for example, redirecting a web browser using the endpoint URL. Data for the second authentication screen 850 may be transmitted to the user computing device for display to the user. The user may submit a password on the second authentication screen 850 to authenticate themselves to the server system 100, and may be permitted to access the services or data of the endpoint 121 if the submitted password is correct for the previously submitted user identifier.

Figure 10:
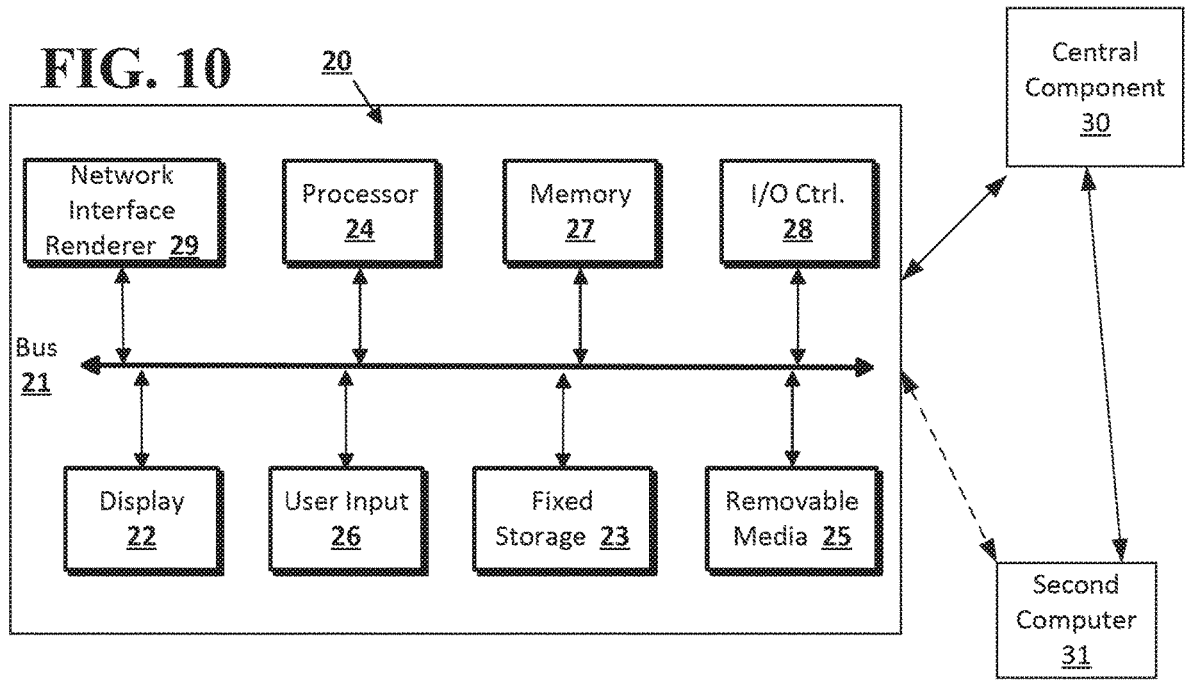
FIG. 10 shows a computer according to an implementation of the disclosed subject matter.

Implementations of the presently disclosed subject matter may be implemented in and used with a variety of component and network architectures. FIG. 10 is an example computer 20 suitable for implementing implementations of the presently disclosed subject matter. As discussed in further detail herein, the computer 20 may be a single computer in a network of multiple computers. As shown in FIG. 10, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively, or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 11.

Many other devices or components (not shown) may be connected in a similar manner (e.g., document scanners, digital cameras and so on). Conversely, all of the components shown in FIG. 10 need not be present to practice the present disclosure. The components can be interconnected in different ways from that shown. The operation of a computer such as that shown in FIG. 10 is readily known in the art and is not discussed in detail in this application. Code to implement the present disclosure can be stored in computer-readable storage media such as one or more of the memory 27, fixed storage 23, removable media 25, or on a remote storage location.

Figure 11:
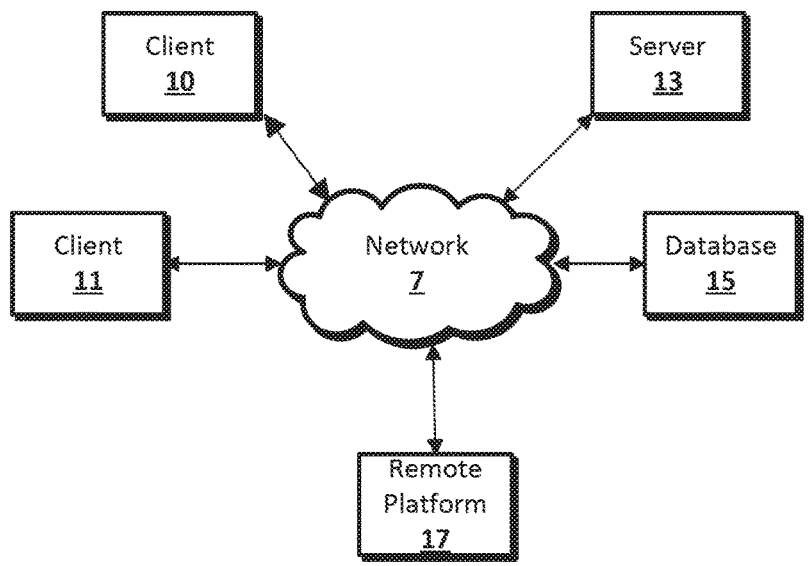
FIG. 11 shows a network configuration according to an implementation of the disclosed subject matter.

FIG. 11 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
receiving, from a user computing device, a user identifier entered into a first authentication screen used to access endpoints hosted on a server system;
determining that the user identifier is an invalid user identifier for the server system;
hashing the user identifier to generate a hashed user identifier;
determining an endpoint number as the hashed user identifier modulo a number of endpoint records assigned numbers on the server system;
retrieving an endpoint URL from an endpoint record of the server system that is associated with a number equal to the endpoint number; and
sending to the user computing device the endpoint URL from the endpoint record and data for a second authentication screen comprising a control for password entry to be displayed on the user computing device, wherein the endpoint URL is displayed on the second authentication screen or is ascertainable from the second authentication screen.

2. The computer-implemented method of claim 1, further comprising:

receiving, from the user computing device, a second user identifier entered into the first authentication screen used to access the endpoint hosted on the server system;
determining that the second user identifier is a valid user identifier for the server system;
hashing the second user identifier to generate a second hashed user identifier;
determining a second endpoint number as the second hashed user identifier modulo the number of endpoint records assigned numbers on the server system;
retrieving a second endpoint URL from an endpoint record of the server system that is associated with a number equal to the second endpoint number;
retrieving a third endpoint URL from an endpoint record of the server system that is associated with an entity that has endpoints on the server system wherein the user identifier is associated with the entity; and
sending to the user computing device the third endpoint URL from the endpoint record that is associated with the entity that has endpoints on the server system and the data for the second authentication screen comprising the control for password entry to be displayed on the user computing device, wherein the endpoint URL is displayed on the second authentication screen or is ascertainable from the second authentication screen.

3. The computer-implemented method of claim 1, wherein the endpoint record of the server system that is associated with the endpoint number is either a real endpoint record or a decoy endpoint record.

4. The computer-implemented method of claim 1, wherein determining that the user identifier is an invalid user identifier comprises determining that the user identifier is not associated with any of a plurality of entities that have endpoints on the server system.

5. The computer-implemented method of claim 1, further comprising:
receiving, from the user computing device, a password entered into the second authentication screen; and
in response to receiving the password, transmitting an error message to the user computing device.

6. The computer-implemented method of claim 5, wherein the error message is always transmitted to the user computing device in response to receiving the password for any received password.

7. The computer-implemented method of claim 1, wherein the endpoint URL of the endpoint record on the server system associated with the endpoint number comprises an alphanumeric string in the form of an indication of an entity used in one or more endpoint URLs of endpoint records of the server system and does not indicate any entity of the server system.

8. The computer-implemented method of claim 1, wherein the endpoint URL points to a fake endpoint of the server system, wherein the fake endpoint makes available no access to services or data.

9. A computer-implemented system for endpoint security comprising:
one or more storage devices; and
a processor that receives, from a user computing device, a user identifier entered into a first authentication screen used to access endpoints hosted on a server system, determines that the user identifier is an invalid user identifier for the server system, hashes the user identifier to generate a hashed user identifier, determines an endpoint number as the hashed user identifier modulo a number of endpoint records assigned numbers on the server system, retrieves an endpoint URL from an endpoint record of the server system that is associated with a number equal to the endpoint number, and sends to the user computing device the endpoint URL from the endpoint record and data for a second authentication screen comprising a control for password entry to be displayed on the user computing device, wherein the endpoint URL is displayed on the second authentication screen or is ascertainable from the second authentication screen.

10. The computer-implemented system of claim 9, wherein the processor further receives, from the user computing device, a second user identifier entered into the first authentication screen used to access the endpoint hosted on the server system, determines that the second user identifier is a valid user identifier for the server system, hashes the second user identifier to generate a second hashed user identifier, determines a second endpoint number as the second hashed user identifier modulo the number of endpoint records assigned numbers on the server system, retrieves a second endpoint URL from an endpoint record of the server system that is associated with a number equal to the second endpoint number, retrieves a third endpoint URL from an endpoint record of the server system that is associated with an entity that has endpoints on the server system wherein the user identifier is associated with the entity, and sends to the user computing device the third endpoint URL from the endpoint record that is associated with the entity that has endpoints on the server system and the data for the second authentication screen comprising the control for password entry to be displayed on the user computing device, wherein the endpoint URL is displayed on the second authentication screen or is ascertainable from the second authentication screen.

11. The computer-implemented system of claim 9, wherein the endpoint record of the server system that is associated with the endpoint number is either a real endpoint record or a decoy endpoint record.

12. The computer-implemented system of claim 9, wherein determining that the user identifier is an invalid user identifier comprises determining that the user identifier is not associated with any of a plurality of entities that have endpoints on the server system.

13. The computer-implemented system of claim 9, wherein the processor further receives, from the user computing device, a password entered into the second authentication screen, and in response to receiving the password, transmits an error message to the user computing device.

14. The computer-implemented system of claim 13, wherein the error message is always transmitted to the user computing device in response to receiving the password for any received password.

15. The computer-implemented system of claim 9, wherein the endpoint URL of the endpoint record on the server system associated with the endpoint number comprises an alphanumeric string in the form of an indication of an entity used in one or more endpoint URL of endpoint records of the server system and does not indicate any entity of the server system.

16. The computer-implemented system of claim 9, wherein the endpoint URL points to a fake endpoint of the server system, wherein the fake endpoint makes available no access to services or data.

17. A system comprising: one or more computers and one or more storage devices storing instructions which are operable, when executed by the one or more computers, to cause the one or more computers to perform operations comprising:
  receiving, from a user computing device, a user identifier entered into a first authentication screen used to access endpoints hosted on a server system;
  determining that the user identifier is an invalid user identifier for the server system;
  hashing the user identifier to generate a hashed user identifier;
  determining an endpoint number as the hashed user identifier modulo a number of endpoint records assigned numbers on the server system;
  retrieving an endpoint URL from an endpoint record of the server system that is associated with a number equal to the endpoint number; and
  sending to the user computing device the endpoint URL from the endpoint record and data for a second authentication screen comprising a control for password entry to be displayed on the user computing device, wherein the endpoint URL is displayed on the second authentication screen or is ascertainable from the second authentication screen.

18. The system of claim 17, wherein the instructions further cause the one or more computers to perform operations comprising:
  receiving, from the user computing device, a second user identifier entered into the first authentication screen used to access the endpoint hosted on the server system;
  determining that the second user identifier is a valid user identifier for the server system;
  hashing the second user identifier to generate a second hashed user identifier;
  determining a second endpoint number as the second hashed user identifier modulo the number of endpoint records assigned numbers on the server system;
  retrieving a second endpoint URL from an endpoint record of the server system that is associated with a number equal to the second endpoint number;
  retrieving a third endpoint URL from an endpoint record of the server system that is associated with an entity that has endpoints on the server system wherein the user identifier is associated with the entity; and
  sending to the user computing device the third endpoint URL from the endpoint record that is associated with the entity that has endpoints on the server system and the data for the second authentication screen comprising the control for password entry to be displayed on the user computing device, wherein the endpoint URL is displayed on the second authentication screen or is ascertainable from the second authentication screen.

19. The system of claim 17, wherein determining that the user identifier is an invalid user identifier comprises determining that the user identifier is not associated with any of a plurality of entities that have endpoints on the server system.

20. The system of claim 17, wherein the instructions further cause the one or more computers to perform operations comprising:
  receiving, from the user computing device, a password entered into the second authentication screen; and
  in response to receiving the password, transmitting an error message to the user computing device.

* * * * *